(12) United States Patent
Ota et al.

(10) Patent No.: US 7,120,108 B2
(45) Date of Patent: Oct. 10, 2006

(54) OBJECTIVE LENS AND OPTICAL PICKUP DEVICE

(75) Inventors: Kohei Ota, Hachioji (JP); Mitsuru Mimori, Kokubunji (JP)

(73) Assignee: Konica Corporation, Tokyo (JP)

( * ) Notice: Subject to any disclaimer, the term of this patent is extended or adjusted under 35 U.S.C. 154(b) by 563 days.

(21) Appl. No.: 10/655,043

(22) Filed: Sep. 5, 2003

(65) Prior Publication Data

US 2004/0047040 A1 Mar. 11, 2004

(30) Foreign Application Priority Data

Sep. 9, 2002 (JP) .............................. 2002-262934
Sep. 10, 2002 (JP) .............................. 2002-264477

(51) Int. Cl.
*G11B 7/00* (2006.01)

(52) U.S. Cl. ............................ 369/112.23; 369/112.01; 369/112.03; 369/112.08

(58) Field of Classification Search ........... 369/112.01, 369/112.23, 112.03, 112.08, 112.13, 112.24, 369/44.23, 44.24

See application file for complete search history.

(56) References Cited

U.S. PATENT DOCUMENTS 6,349,000 B1 * 2/2002 Yamagata et al. .......... 359/575

* cited by examiner

*Primary Examiner*—Nabil Hindi
(74) *Attorney, Agent, or Firm*—Finnegan, Henderson, Farabow, Garrett & Dunner, L.L.P.

(57) ABSTRACT

An objective lens to converge a light flux having a working reference wavelength $\lambda_0$ (380 nm$\leq\lambda_0\leq$450 nm) under a working reference temperature $T_0$ onto an optical information recording medium equipped with a protective substrate having a thickness of 0.6 mm with almost no aberration. The diffractive structural section of the objective lens has a first compensating function to compensate a change amount $\delta SA1$ of the third-order spherical aberration component of wavefront aberration caused by a fluctuation of a working wavelength, a second compensating function to compensate a deviation $\delta WD$ of a converged-light spot in an optical axis direction caused by a fluctuation of a working wavelength, and a third compensating function to compensate a change amount $\delta SA2$ of the third-order spherical aberration component of wavefront aberration caused by a change of a refractive index of the lens body.

19 Claims, 8 Drawing Sheets

DIAGRAM OF VERTICAL SPHERICAL
ABERRATION IN WAVELENGTH CHANGE

DIAGRAM OF VERTICAL SPHERICAL ABERRATION
IN TEMPERATURE CHANGE (+40°C)

TERTIARY SPHERICAL ABERRATION
IN WAVELENGTH CHANGE

DEVIATION OF LIGHT-CONVERGED
SPOT IN WAVELENGTH CHANGE

TERTIARY SPHERICAL ABERRATION
IN TEMPERATURE CHANGE

OBJECTIVE LENS AND OPTICAL PICKUP DEVICE

BACKGROUND OF THE INVENTION

The present invention relates to an optical pickup device for conducting recording and/or reproducing for an optical information recording medium and to an objective lens used in the optical pickup device.

In an optical system of an optical pickup device wherein DVD (digital versatile disk) representing an optical disk (optical information recording medium) is used as a medium, there is used a laser having a wavelength of about 650 nm (for example, see Patent Document 1).

In recent years, there has been advanced development of HD-DVD (high density DVD) representing an optical disk that is similar to DVD in terms of a size and is greater than DVD in terms of capacity. In the optical system of the optical pickup device employing this HD-DVD as a medium, a diameter of the light-converging spot is made small by using a violet laser with a short wavelength (380–450 nm approximately), for the purpose of achieving high density of recording signals or of reproducing high density recording signals.

(Patent Document)
1. TOKKAIHEI No. 11-337818
2. TOKKAIHEI No. 6-242373

SUMMARY OF THE INVENTION

However, in the optical system of the optical pickup device employing a laser with a wavelength that is as short as the foregoing, following two problems which have been insignificant in the optical system of the optical pickup device employing conventional DVD as a medium affect greatly.

Namely, one of them is a problem of changes in tertiary order spherical aberration components of spherical aberration of an objective lens caused by microscopic changes in used wavelength of a laser light source and of shifting of light-converging spot in the direction of an optical axis. In general, the shorter the used wavelength is, the greater the change of refractive index of an optical lens caused by microscopic changes of the used wavelength is, resulting in that changes in tertiary order spherical aberration components of wavefront aberration and shifting of light-converging spot are generated greatly, and recording and reproducing of information are disturbed.

Another problem is a change in tertiary order spherical aberration component of wavefront aberration of the objective lens caused by temperature changes. An objective lens made of plastic used generally in an optical pickup device tends to be deformed by temperature changes, and this deformation changes the refractive index of the objective lens, resulting in the change of the tertiary order spherical aberration of wavefront aberration. Amount of change $\Delta SA$ (unit: $\lambda rms$) of the tertiary order (third order) spherical aberration component of this wavefront aberration is one expressed roughly by the following expression;

$$\Delta SA = k \cdot f (1-M)^4 (NA)^4 \cdot \Delta T / \lambda$$

(wherein, k represents a constant, f represents an image-side focal length, M represents a magnification, NA represents an image-side numerical aperture, $\Delta T$ represents a temperature change and $\lambda$ represents a wavelength). Therefore, as is clear from this expression, the shorter the used wavelength is, the greater $\Delta SA$ is. In the optical system of the optical pickup device employing a laser with a short wavelength, therefore, recording and reproducing of information are disturbed by changes of tertiary order spherical aberration components of wavefront aberration of the objective lens caused by temperature changes.

An object of the invention is to provide an optical pickup device capable of conducting recording and reproducing of information independently of changes in wavelengths and temperatures by using a laser light source with a wavelength of about 380–450 nm, and to provide an objective lens of the optical pickup device.

Incidentally, in the above patent document 2, an objective lens is disclosed wherein a ring-shaped structure having a plurality of ring-shaped zones is formed on the optical surface of the objective lens, and incident light passing through the ring-shaped structure is allowed to produce a predetermined difference of the light path, which compensates for the above chromatic aberration. By using such an objective lens, it is possible to control spherical aberration of the aspheric lens as well as to compensate for axial chromatic aberration, however, it is difficult to compensate for the before-mentioned thermal characteristic aberration, which is still a problem.

Further, in recent years, an optical pick-up apparatus, having a 0.1 mm protecting base, was researched and developed, and technology for the optical pick-up apparatus capable of solving the above-stated problem was proposed. However, concerning the optical element and the high density optical pick-up apparatus using that optical element with a protecting base 0.6 mm in thickness, being similar to that of the optical disk for normal DVDs, and with a 0.65 numerical aperture, technology which could solve the above problems was seldom proposed.

An object of the present invention is to solve the above-stated problems, that is, to propose an optical element and an optical pick-up apparatus using that optical element, which is employed for an optical information recording medium using working standard wavelengths of 380–450 nm, and having a protecting base of about 0.6 mm in thickness, and which can also compensate for axial chromatic aberration and spherical aberration caused by changes of temperature.

DETAILED DESCRIPTION OF THE PREFERRED EMBODIMENT

Hereinafter, the embodiment to achieve the above object of the present invention is described.

Item (1)

Figure 1:
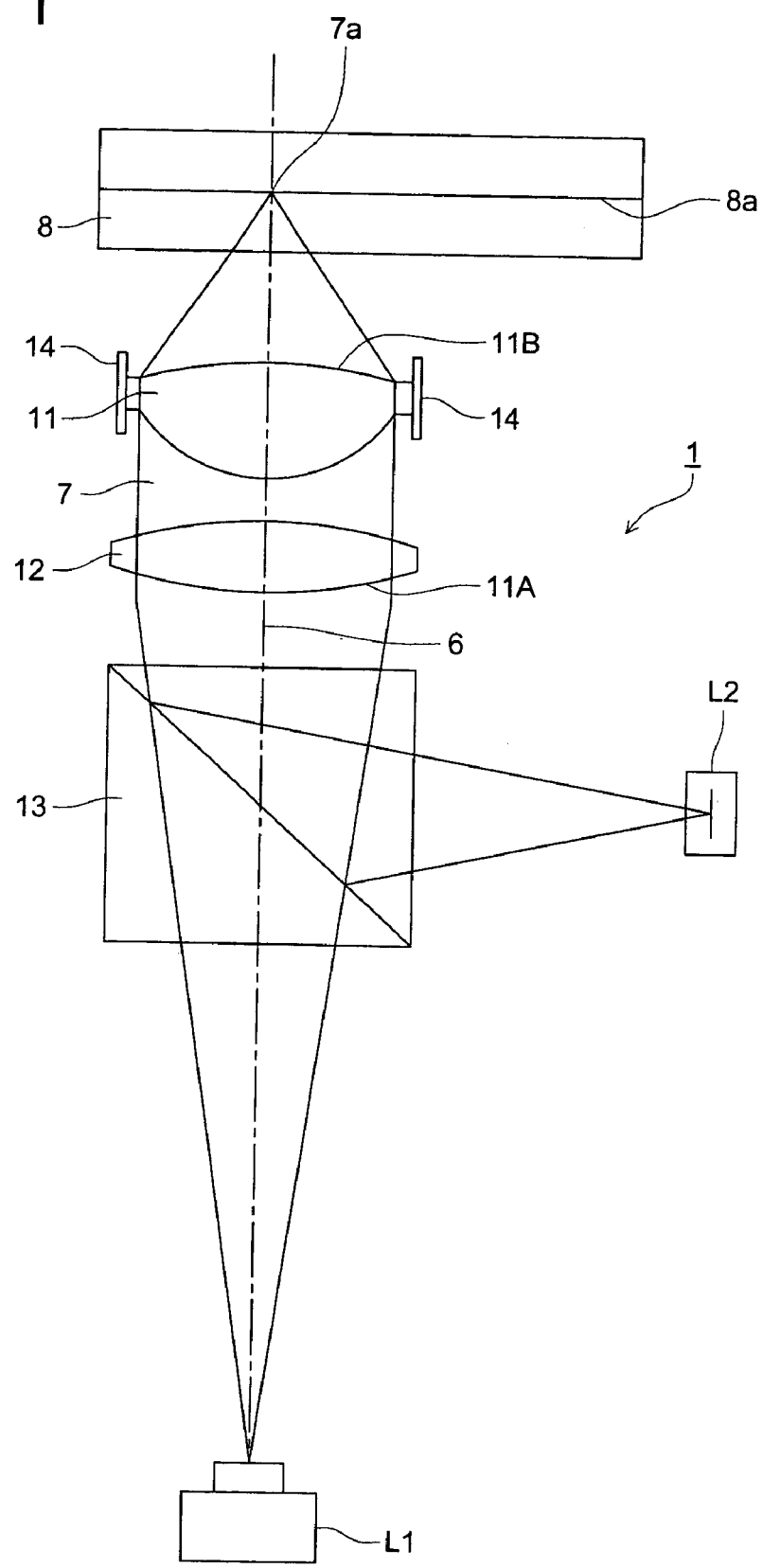
FIG. 1 is a schematic diagram of the overall structure representing an example of an optical pickup device relating to the invention.
Figure 2:
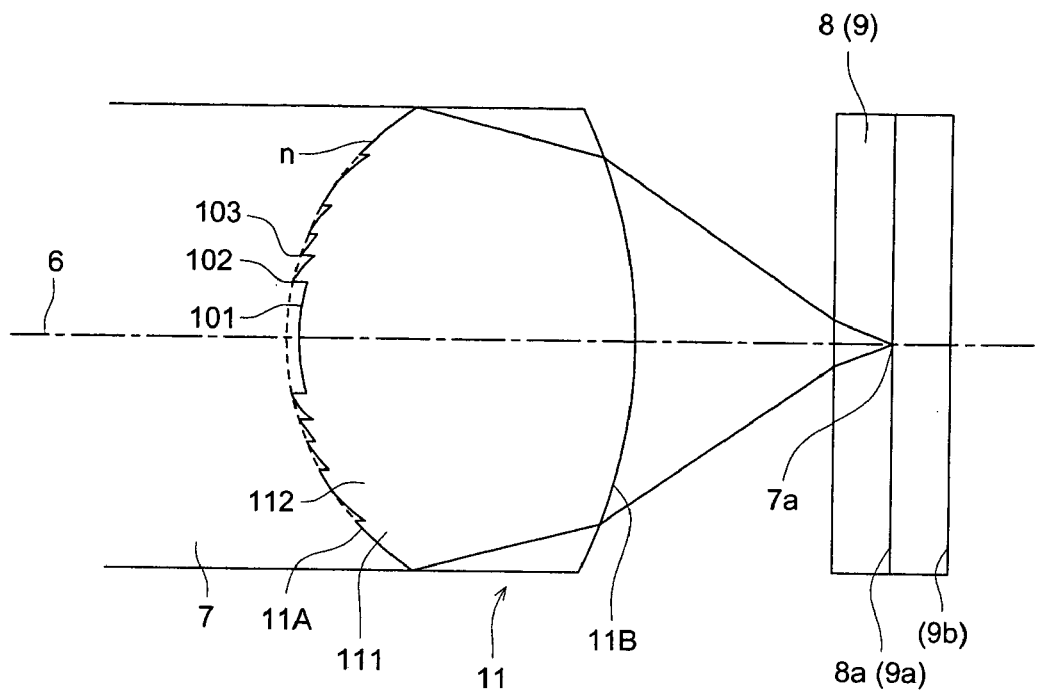
FIG. 2 is a side view showing an outline of an objective lens relating to the invention.
Figure 3:
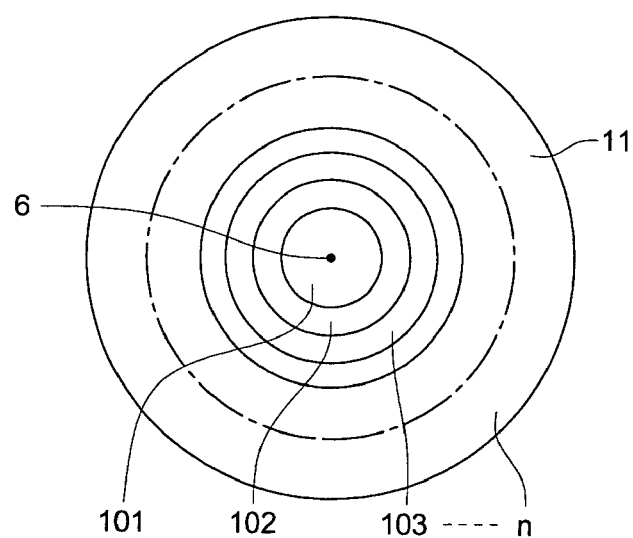
FIG. 3 is a front view showing an outline of an objective lens relating to the invention.

The structure described in Item (1) is objective lens 11 that is used in optical pickup device 1 which conducts recording of information and/or reproducing of recorded information for optical information recording medium 8 having a protective base board with a thickness of 0.6 mm, as shown, for example, in FIG. 1–FIG. 3, and converges a light flux with standard wavelength for use λ$_0$ (380≦λ$_0$≦450) emitted from laser light source L1 at standard temperature for use T$_0$ on information recording surface 8a of the optical information recording medium 8 with aberration which is almost zero, wherein lens main body 111 and diffractive structure portion 112 that is provided on at least one optical functional surface of the lens main body 111 are provided, and the diffractive structure portion 112 is provided with a first compensating function that compensates amount of change δSA1 of tertiary order spherical aberration component of wavefront aberration for each of the lens main body 111 and the diffractive structure portion 112 caused by the change of wavelength for use λ (|λ−λ$_0$|≦10 nm) to be a certain value or less, a second compensating function that compensates shifting δWD of light-converging spot 7a in the direction of optical axis 6 caused by the change of wavelength for use λ to be a certain value or less and with a third compensating function that compensates amount of change δSA2 of tertiary order spherical aberration component of wavefront aberration for each of the lens main body 111 and the diffractive structure portion 112 caused by the refractive index of the lens main body 111 in the case of the change of temperature for use T (|T−T$_0$|≦40° C.) to be a certain value or less.

In this case, an optical information recording medium that has a protective base board whose thickness is 0.6 mm and uses standard wavelength λ$_0$ of 380–450 nm includes, for example, HD-DVD (high density DVD).

Further, standard temperature for use T$_0$ is a certain temperature within a range of temperature change in surroundings in which an optical pickup device is used, and it is a certain temperature in a normal temperature (about 10–40° C.).

Standard wavelength for use λ$_0$ is a wavelength of a light flux that is emitted usually at standard temperature for use T$_0$ by a laser light source to be used. Wavelength for use λ includes a wavelength of a light flux which is emitted by a laser light source at temperature for use T and a wavelength of a light flux in the case of mode hop. Incidentally, mode hop is a phenomenon wherein when power of a light flux emitted from a laser light source rises, a wavelength of the light flux becomes longer instantaneously.

Further, "to converge with aberration which is almost zero" mentioned above means that "a light flux is converged so that an absolute value of wavefront aberration may be 0.07 λ$_0$rms or less".

In the structure described in Item (1), it is possible to compensate amount of change δSA1 of tertiary order spherical aberration component of wavefront aberration of a lens main body and the diffractive structure portion, namely, of an objective lens caused in the case of change in wavelength for use λ of a laser light source, to be a certain value or less, because the diffractive structure portion is provided with a first compensating function. Incidentally, the change in wavelength for use λ of a laser light source includes an occasion where wavelength for use λ is changed by dispersion of oscillated wavelength between laser light source individuals, an occasion where a wavelength used is changed by instantaneous extension of a wavelength, namely, by the so-called mode hop in the course of data recording on an optical information recording medium, and an occasion where the wavelength used is changed by the change of temperature used T.

In addition, it is possible to compensate shifting δWD of light-converging spot in the direction of optical axis caused by the change of wavelength for use λ of a laser light source to be a certain value or less because the diffractive structure portion is provided with a second compensating function.

Further, it is possible to compensate amount of change δSA2 of tertiary order spherical aberration component of wavefront aberration of a lens main body and the diffractive structure portion, namely, of an objective lens caused by changes in refractive index when the refractive index of the lens main body is changed by a change of temperature used T of an optical pickup device, to be a certain value or less, because the diffractive structure portion is provided with a third compensating function.

It is therefore possible to conduct recording and reproducing of information independently of the change in wavelength for use λ and temperature for use T.

Incidentally, since it is difficult to compensate completely amount of change δSA1 and amount of change δSA2 each of tertiary order spherical aberration component of wavefront aberration of the lens main body and the diffractive structure portion and shifting δWD of a light-converging spot with the first, second and third compensating functions of the diffractive structure portion, it is preferable to keep amount of change δSA1 and amount of change δSA2 each of tertiary order spherical aberration component of wavefront aberration of the lens main body and the diffractive structure portion and shifting δWD of a light-converging spot in an appropriate range by adjusting the first, second and third compensating functions relatively.

Item (2)

The structure described in Item (2) is the objective lens 11 according to the Item 1 as shown in FIGS. 1–3, for example, wherein amount of change δSA1 of tertiary order spherical aberration component of wavefront aberration of the lens main body 111 and the diffractive structure portion 112 caused when the wavelength for use λ is changed by 5 nm is compensated by the first compensating function of the diffractive structure portion 112 to be within a range of the following expression.

$$|\delta SA1| \leq 0.04\ \lambda_0 rms$$

In this case, a value of δSA1 which is negative means that the change of the tertiary order spherical aberration is on the under side, namely, the change is compensated toward a light source on the optical axis. On the contrary, a value of δSA1 which is positive means that the change of the tertiary order spherical aberration is on the over side, namely, the change is compensated toward an image on the optical axis.

In the structure described in Item (2), amount of change δSA1 of tertiary order spherical aberration component of wavefront aberration of the lens main body and the diffractive structure portion caused when the wavelength for use λ is changed by 5 nm is compensated by the first compensating function of the diffractive structure portion to be within a range of the following expression, which makes it possible to conduct recording and reproducing of information surely independently of changes in wavelength for use λ.

$$|\delta SA1| \leq 0.04 \ \lambda_0 rms$$

Item (3)

The structure described in Item (3) is the objective lens 11 according to either one of the Items 1 and 2 as shown in FIGS. 1–3, for example, wherein amount of change δSA1 of tertiary order spherical aberration component of wavefront aberration of the lens main body 111 and the diffractive structure portion 112 caused when the wavelength for use λ is changed by 1 nm is compensated by the first compensating function of the diffractive structure portion 112 to be within a range of the following expression.

$$-0.008 \ \lambda_0 rms \leq \delta SA1 \leq -0.003 \ \lambda_0 rms$$

When a laser light source having a standard wavelength for use of 380–450 nm is used, a change in a used wavelength caused by a temperature change of 1° C. is small, compared with a conventional occasion where a laser light source having a standard wavelength for use of 650 nm is used. To be concrete, for temperature rise of 1° C., for example, an oscillated wavelength of a laser light source having a standard wavelength for use of 650 nm is lengthened by 0.2 nm, while, an oscillated wavelength of a laser light source having a standard wavelength for use of 405 nm is lengthened by 0.05 nm. Therefore, when a laser light source having a standard wavelength for use of 380–450 nm is used, an amount of wavelength change caused by temperature changes is smaller for an amount of wavelength change caused by reasons other than temperature changes, compared with an occasion where a laser light source having a standard wavelength for use of 650 nm is used. Therefore, when the third compensating function of the diffractive structure portion is strengthened by generating greatly the tertiary order spherical aberration component of wavefront aberration caused by wavelength changes, and the first compensating function is weakened on the contrary, when wavelength changes which are not caused by temperature changes are generated greatly, changes in tertiary order spherical aberration components of wavefront aberration caused by the wavelength changes are not compensated sufficiently by the first compensating function, and recording and reproducing of information are sometimes disturbed.

In the structure described in Item (3), amount of change δSA1 of tertiary order spherical aberration component of wavefront aberration of the lens main body and the diffractive structure portion caused when the wavelength for use λ is changed by 1 nm is compensated by the first compensating function of the diffractive structure portion within a range on the under side prescribed by $-0.008 \ \lambda_0 rms \leq \delta SA1 \leq -0.003 \ \lambda_0 rms$. Therefore, amount of change δSA1 of tertiary order spherical aberration component of wavefront aberration caused by changes in wavelength for use λ resulting from changes of temperature for use T and amount of change δSA1 of tertiary order spherical aberration component of wavefront aberration caused by wavelength changes which are not caused by changes in temperature for use T can be compensated by the first compensating function of the diffractive structure.

Now, the reason why amount of change ΔSA1 of tertiary order spherical aberration is established to be equal to or higher than $-0.008 \ \lambda_0 rms$ is that the change of tertiary order spherical aberration of wavefront aberration caused by wavelength change of 5 nm cannot be compensated sufficiently when the amount of change ΔSA1 is less than $-0.008 \ \lambda_0 rms$, and recording and reproducing of information cannot be conducted. Further, the reason why amount of change ΔSA1 of tertiary order spherical aberration is established to be equal to or lower than $-0.003 \ \lambda_0 rms$ is that the change of tertiary order spherical aberration of wavefront aberration caused by a refractive index change of a lens main body caused by changes in used temperature T cannot be compensated sufficiently when the amount of change ΔSA1 is greater than $-0.003 \ \lambda_0 rms$, and recording and reproducing of information cannot be conducted.

Item (4)

The structure described in Item (4) is the objective lens 11 according to either one of the Items 1–3 as shown in FIGS. 1–3, for example, wherein shifting δWD of the light-converging spot 7a in the direction of an optical axis caused when the wavelength for use λ is changed by 1 nm is compensated by the second compensating function of the diffractive structure portion 112 to be in the following range.

$$|\delta WD| \leq 0.1 \ \mu m$$

In the aforementioned expression, when a value of δWD is negative, it indicates that the light-converging spot is shifted to the "over" side, namely, toward the "image" side on the optical axis.

Further, a width of a light-converging spot in the optical axis direction wherein a diameter of geometrical optical light-converging spot is not more than $(\lambda_0/2NA)$ is called a focal depth $(\lambda_0/2NA^2)$. When a diameter of light-converging spot is not more than $(\lambda_0/2NA)$, light can be regarded to be converged on one point in terms of practical use. Therefore, if the light-converging spot is within a range of the focal depth, a diameter of the light-converging spot is not more than $(\lambda_0/2NA)$, which makes it possible to record and reproduce for an optical information recording medium. Therefore, if shifting δWD of the light-converging spot in the direction of an optical axis caused when the wavelength for use λ of a laser light source is changed from the standard wavelength for use $\lambda_0$ is within a range of a half of the focal depth, recording and reproducing for an optical information recording medium can be conducted.

For example, in the optical pickup device employing HD-DVD as a medium, numerical aperture NA is about 0.65–0.85 and standard wavelength for use $\lambda_0$ is about 380–450 nm. Therefore, the focal depth of this optical system is about 280–470 nm.

In the structure described in Item (4), shifting δWD of the light-converging spot caused when the wavelength for use λ is changed by 1 nm is compensated by the second compensating function of the diffractive structure portion to be within a range of $|\delta WD| \leq 0.1 \ \mu m$, and therefore, it can be within a range of a half of the focal depth in the optical pickup device employing HD-DVD as a medium, for example. Therefore, in the optical pickup device employing HD-DVD as a medium, recording and reproducing of information can be conducted surely, independently of changes in wavelength for use λ.

Item (5)

The structure described in Item (5) is the objective lens 11 according to either one of the Items 1–4 as shown in FIGS. 1–3, for example, wherein paraxial power φD of the diffractive structure portion 112 satisfies the following expression;

$$0 \leq \phi D/\phi D_0 \leq 0.7$$

(wherein, $\phi D_0$ is a paraxial power of the diffractive structure portion 112 shown when chromatic aberration in a paraxial area of the lens main body is corrected completely when power of the diffractive structure portion 112 is changed without changing power of the lens main body 111).

In this case, paraxial power φD of the diffractive structure portion is power of a paraxial area of the diffractive structure portion. Shifting δWD of the light-converging spot in the optical axis direction caused when the wavelength for use λ of a light source is changed can be compensated by compensating spherical aberration of the lens main body toward the "under" side with a diffractive action of the diffractive structure portion or by making the paraxial power φD of the diffractive structure portion to be a positive value.

In the structure described in Item (5), shifting δWD of the light-converging spot in the optical axis direction caused when the wavelength for use λ of a light source is changed can be compensated because paraxial power φD of the diffractive structure portion satisfies the expression $0 \leq \phi D/\phi D_0 \leq 0.7$. Therefore, Therefore, recording and reproducing of information can be conducted surely, independently of changes in wavelength for use λ.

In this case, the reason why the value obtained by dividing φD by $\phi D_0$ in terms of paraxial power of the diffractive structure portion is established to be 0 or more is that the value of $\phi D/\phi D_0$ which is less than zero makes it impossible to compensate the change of tertiary order spherical aberration component of wavefront aberration in a paraxial area of the lens main body and the diffractive structure portion caused when the wavelength for use λ is changed, and to conduct recording and reproducing of information. Further, the reason why the value obtained by dividing φD by $\phi D_0$ in terms of paraxial power of the diffractive structure portion is established to be 0.7 or less is that, when the value of $\phi D/\phi D_0$ is greater than 0.7, amount of change δSA2 of tertiary order spherical aberration of wavefront aberration caused by changes of temperature for use T is not compensated sufficiently, causing some occasions where recording and reproducing of information cannot be conducted, when amount of change δSA1 of tertiary order spherical aberration component of wavefront aberration and shifting δWD of light-converging spot are made by the first and second compensating functions of the diffractive structure portion to be capable of being compensated to be within ranges described in Items 2–4.

Item (6)

The structure described in Item (6) is the objective lens 11 according to either one of the Items 1–5 as shown in FIGS. 1–3, for example, wherein amount of change δSA2 of tertiary order spherical aberration component of wavefront aberration of the lens main body 111 and the diffractive structure portion 112 caused by the change in refractive index of the lens main body 111 that is caused when the temperature for use T is changed by 40° C., is compensated by the third compensating function of the diffractive structure portion 112 to be within the range of the following expression.

$$|\delta SA2| \leq 0.055 \ \lambda_0 rms$$

In this case, a value of δSA2 which is negative means that the change of the tertiary order spherical aberration is on the under side, namely, the change is compensated toward a light source on the optical axis. On the contrary, a value of δSA2 which is positive means that the change of the tertiary order spherical aberration is on the over side, namely, the change is compensated toward an image on the optical axis.

In the structure described in Item (6), amount of change δSA2 of tertiary order spherical aberration component of wavefront aberration of the lens main body and the diffractive structure portion caused by the change of refractive index of lens main body that is caused when temperature for use T is changed by 40° C. is compensated by the third compensating function of the diffractive structure portion to be within a range of $|\delta SA2| \leq 0.03 \ \lambda_0 rms$, and therefore, recording and reproducing of information can be conducted surely, independently of changes in temperature for use T.

Item (7)

The structure described in Item (7) is the objective lens 11 according to either one of the Items 1–6 as shown in FIGS. 1–3, for example, wherein the diffractive structure portion 112 is formed to be divided into plural ring-shaped zones by concentric circles on the center of optical axis 6, and it satisfies the following expression;

$$90 \leq Lm \ (f^{1/2}) \leq 300$$

(wherein, L represents the number of ring-shaped zones, m represents the order of diffracted light having the greatest diffraction efficiency among diffracted light generated by the diffractive structure portion 112 when conducting recording of information and/or reproducing of information recorded for the optical information recording medium 8, and f represents a focal length (mm)).

In the structure described in Item (7), the same effects as in Items 1–6 are obtained by the objective lens composed of a diffractive structure portion having ring-shaped zones in number prescribed by the above expression and of a lens main body.

Item (8)

The structure described in Item (8) is the objective lens 11 according to either one of the Items 1–7 as shown in FIGS. 1–3, for example, wherein the diffractive structure portion 112 is formed to be divided into plural ring-shaped zones by concentric circles on the center of optical axis 6, and it satisfies the following expression;

$$140 \leq Lm \ (f^{1/2}) \leq 220$$

(wherein, L represents the number of ring-shaped zones, m represents the order of diffracted light having the greatest diffraction efficiency among diffracted light generated by the diffractive structure portion 112 when conducting recording of information and/or reproducing of information recorded for the optical information recording medium 8, and f represents a focal length mm).

In the structure described in Item (8), the same effects as in Items 1–7 are obtained by the objective lens composed of a diffractive structure portion having ring-shaped zones in number prescribed by the above expression and of a lens main body.

Item (9)

The structure described in Item (9) is the objective lens 11 according to either one of the Items 1–8 as shown in FIGS. 1–3, for example, wherein image-side numerical aperture of the objective lens main body 11 is not less than 0.60 and is not more than 0.90.

In the structure described in Item (9), it is possible to prevent that recording density of an optical information recording medium is lowered as an image-side numerical aperture of the objective lens becomes smaller, and to prevent that manufacture of the objective lens becomes difficult as an image-side numerical aperture grows greater.

Item (10)

The structure described in Item (10) is the objective lens 11 according to either one of the Items 1–9 as shown in FIGS. 1–3, for example, wherein an image-side numerical aperture of the lens main body 111 is 0.65.

In the structure described in Item (10), an image-side numerical aperture of the lens main body is 0.65 and it is within a range of numerical aperture 0.65–0.85 necessary for recording and reproducing of information for HD-DVD, thus, the same effects as those in Items 1–9 are obtained as an objective lens used in an optical pickup device employing HD-DVD as a medium.

Item (11)

The structure described in Item (11) is the objective lens 11 according to either one of the Items 1–10 as shown in FIGS. 1–3, for example, wherein the lens main body 111 and the diffractive structure portion 112 are made of plastic.

In the structure described in Item (11), molding of an objective lens is easy, and a material is lower in cost and is lighter compared with glass, which makes an optical pickup device to be light in weight and low in cost.

Item (12)

The structure described in Item (12) is optical pickup device as shown in FIGS. 1–3, for example, wherein objective lens 11 described in either one of Items 1–11 is provided, and a light flux emitted from laser light source L1 is converged on information recording surface 7a of optical information recording medium 8 for conducting recording and/or reproducing of information.

In the structure described in Item (12), it is possible to compensate amount of change δSA1 of tertiary order spherical aberration component of wavefront aberration of the lens main body and the diffractive structure portion that is caused when wavelength for use λ of a laser light source is changed, to a certain value or less, because the diffractive structure portion of the objective lens is provided with the first compensating function.

Further, it is possible to compensate shifting δWD of the light-converging spot in the optical axis direction caused when the wavelength for use λ of a laser light source is changed to a certain value or less, because the diffractive structure portion of the objective lens is provided with the second compensating function.

In addition, it is possible to compensate amount of change δSA2 of tertiary order spherical aberration component of wavefront aberration of the lens main body and the diffractive structure portion that is caused when the diffractive index of the lens main body is changed when temperature for use T of the optical pickup device is changed, because the diffractive structure portion of the objective lens is provided with the third compensating function.

It is therefore possible to conduct recording and reproducing of information, independently of changes in wavelength for use λ and temperature for use T.

Item 13.

An optical element (objective lens 4 for example), being employed in optical pick-up apparatus 1 which performs recording and/or reproducing of information on optical information recording medium 5 whose thickness of a protective substrate is approximately 0.6 mm, which converges the light flux of the working standard wavelengths of 380–450 nm onto information recording surface 7 of the above-mentioned optical information recording medium, and further provides a diffractive structure including L pieces of ring-shaped zones around optical axis LA on at least a single optical surface, wherein when the reproducing and/or recording of information onto the optical information recording medium is performed, with "k" (a positive integer) as the order of the diffracted light ray having maximum diffraction efficiency among diffracted light rays generated by the diffractive structure, and "f" mm as the focal length, the following formula holds.

Formula:

$$90 \leq Lk\,(f^{1/2}) \leq 300$$

In the present specification, "protective substrate" means an optically transparent plane-parallel plate, formed on a light flux incident surface of the recording surface, which protects the information recording surface of the optical information recording medium, and "thickness of the protective substrate" means the thickness of the plane-parallel plate. The light fluxes emitted from a light source are brought to a focus by the objective lens, through the protective substrate, on the information recording surface of the information recording medium.

Further, "optical elements" mean members of which an optical system of the optical pick-up apparatus is composed, such as an objective lens, a coupling lens (collimator lens), a beam expander, a beam shaper, and a correcting plate.

The optical element is not limited to one which is composed of a single member, but can include a lens group composed of a plurality of lenses structured in the axial direction.

"Objective lens", in the narrow sense, means a lens having a focusing function, arranged nearest to the optical information recording medium, and facing that optical information recording medium, under the condition that the optical information recording medium is located in the optical pick-up apparatus, while, in the broad sense, the objective lens also means that lens which is able to move by an actuator at least in the axial direction of that lens.

Accordingly, in the present specification, an image side numerical aperture of the objective lens means a numerical aperture of the lens surface of the objective lens arranged at a position nearest to the optical information recording medium.

Further in the present specification, "necessary (and predetermined) numerical aperture" means the numerical aperture decided in the standard of the optical information recording medium, or it means the numerical aperture of the objective lens, having a diffraction marginal performance with which the diameter of beam spot can be obtained, being necessary for recording or regenerating information, in accordance with the wavelength of the light source used for the optical information recording medium.

Still further, "numerical aperture" means the numerical aperture which is defined as a result where the light flux for forming the beam spot on a best image point, is controlled by parts or members having a light stopping capability, such as a diaphragm or a filter, being provided in the optical pick-up apparatus, or is also controlled by a diffractive pattern arranged on the optical element, such as the objective lens.

"Working standard wavelength" means the wavelength of the light flux emitted from the light source used at a working standard temperature. On a contrary, "working wavelength" means the wavelength of the light flux emitted from the light source at the working temperature.

"Working standard temperature" means the ambient temperature (10–40° C.), in which the temperature of the environment changes, when the optical element and the optical pick-up apparatus are used.

"Recording of information" means to record information onto the information recording surface of the information recording medium, while "reproducing of information" means to regenerate information which is recorded on the information recording surface of the optical information recording medium.

Further, the optical element of the present invention is one which performs only recording of information, or performs only reproducing of information, or one which performs both recording of information and reproducing of information. Specifically, the reproducing includes simply reading out of information.

"Optical surface (diffractive surface) having the diffractive structure", means the surface of the optical element such as the lens, on which a relief is provided to diffract the incident light flux, and further, when there are the area on which the diffraction occurs and the area on which the diffraction does not occur, on one optical surface, it means the area on which the diffraction occurs.

The relief shapes are such that the ring-shaped zones are nearly concentrically formed on the optical axis on the surface of the optical element, and its sectional view, cut by a plane including the optical axis, shows steps or a saw-tooth shape of each ring-shaped zone.

Generally, an infinite order of diffracted light fluxes, such as zero-ordered diffracted light, ± first ordered diffracted light, ± second ordered diffracted light, and so forth, are generated by the optical surface having the diffractive structure thereon. Concerning the diffractive surface with a relief whose meridian section is saw-toothed, it is possible to increase the diffractive efficiency of the specified ordered diffracted light to be greater than that of other ordered diffracted light, and further, it is possible to specifically produce the shape of the relief so that the diffractive efficiency of one of the specified ordered diffracted light rays (for example, + first ordered diffracted light) is increased to 100%.

Further, "diffraction efficiency" in the present specification means the ratio of the amount of diffracted light generated by the diffractive structure, whereby the total sum of the diffraction efficiencies of the total ordered diffracted light rays is equal to 1.

Still further, in the present invention, "order k of the diffracted light having the maximum diffraction efficiency" means the diffraction order which gives the greatest efficiency, compared with other orders, when light rays at working standard wavelengths of 380–450 nm enter the optical element.

In the structure described in Item 13, in the case that the recording and/or reproducing of information is performed onto and/or from the information recording surface of the optical information recording medium having the protective substrate of about 0.6 mm in thickness, through condensing the light flux of working standard wavelengths of 380–450 nm, when the order of the diffracted light flux having the maximum diffraction efficiency is shown by k (a positive integer) among the diffracted light fluxes produced by the diffractive structure including L pieces of the ring-shaped zones around the optical axis, and the focal distance is shown by f mm, it is possible to obtain an optical element which can compensate for axial chromatic aberration and spherical aberration caused by changes of temperature, by holding the following formula, Formula:

$$90 \leq Lk \, (f^{1/2}) \leq 300$$

Accordingly, when light flux having the working standard wavelengths of 380–450 nm, is used for the optical information recording medium having the protective substrate of about 0.6 mm in thickness, and even when the optical element is formed of plastic material whose refraction index and shape are easily changed by a change of temperature, it is possible to control the generation of thermal characteristic aberration, and it is further possible to control the generation of axial chromatic aberration, which occurs when the wavelength of the laser beam increases due to mode hop.

Further, it is possible to obtain the optical element which can increase the utilization efficiency of the laser beam, by focusing k-ordered diffracted light flux, which generates the maximum diffraction efficiency. Item 14.

The optical element described in Item 13, wherein the following formula applies.

Formula:

$$140 \leq Lk \, (f^{1/2}) \leq 220$$

Item 15.

The optical element described in Item 13 or 14, wherein the numerical aperture is equal to or greater than 0.60, and is equal to or smaller than 0.70.

Item 16.

The optical element described in any one of Items 13–15, wherein the numerical aperture is equal to 0.65.

Item 17.

The optical element described in any one of Items 13–16, wherein the optical element is formed of plastic.

By the structure described in Item 17, it is possible to obtain effects similar to those of Items 13–16, and it is also possible to reduce the raw material cost, still further it is possible to eliminate production cost of the optical element, because the optical elements having the diffractive ring-shaped zones can be produced on a large scale by inexpensive injection molding.

Item 18.

An optical pick-up apparatus which performs recording and/or reproducing of information on optical information recording medium, the protective substrate of which is approximately 0.6 mm in thickness, and further which converges light flux of standard wavelengths of 380–450 nm onto the information recording surface of optical information recording medium, wherein the optical element provides a diffractive structure including L pieces of ring-shaped zones around the optical axis, on at least a single optical surface, and wherein when reproducing from and/or recording of information onto the optical information recording medium is performed, with k (a positive integer) as the order of the diffracted light rays having the maximum diffraction efficiency, among the diffracted light rays generated by the diffractive structure, and with f mm as the focal length, the following formula holds.

Formula:

$$90 \leq Lk\ (f^{1/2}) \leq 300$$

By the structure described in Item 18, when the recording and/or reproducing of information is performed onto and/or from the information recording surface of the optical information recording medium having protective substrate of about 0.6 mm in thickness, by condensing the light flux of working standard wavelengths of 380–450 nm, among the diffracted light fluxes produced by the diffractive structure including L pieces of the ring-shaped zones around the optical axis of the optical element, the order of the diffracted light flux having the maximum diffraction efficiency is shown by k (a positive integer), and the focal distance is f mm, the following formula holds:

Formula:

$$90 \leq Lk\ (f^{1/2}) \leq 300$$

it is possible to obtain an optical pick-up apparatus which can compensate for axial chromatic aberration and spherical aberration caused by changes of temperature.

Further, it is possible to obtain the optical pick-up apparatus which can increase the utilization efficiency of laser beams, by focusing k-ordered diffracted light flux, which generates the maximum diffraction efficiency.

Item 19.

The optical pick-up apparatus described in Item 18, wherein the following formula holds:

Formula:

$$90 \leq Lk\ (f^{1/2}) \leq 300$$

An optical pickup device and an optical element of the invention will be explained as follows, referring to the drawings.

FIG. 1 is a schematic diagram of the overall structure of optical pickup device 1.

The optical pickup device 1 is one for conducting recording and reproducing of information by using HD-DVD 8 as a medium under the conditions of standard temperature for use $T_0 = 25°$ C. and standard wavelength for use $\lambda_0 = 405$ nm. To be more precise, the optical pickup device 1 is one that makes a light flux with standard wavelength for use $\lambda_0$ emitted from laser light source L1 to pass through collimator lens and objective lens 11 to be converged on information recording surface 8a of HD-DVD 8 (optical information recording medium) on optical axis 6 to form light-converging spot 7a, and takes reflected light from the information recording surface 8a of HD-DVD 8 with beam splitter 13 to form a beam spot again on a light-receiving surface of detector L2. This optical pickup device 1 is arranged so that the objective lens 11 is moved by actuator 14 in the optical axis direction so that light-converging spot 7a may be formed on the information recording surface 8a of HD-DVD 8 under the conditions of each temperature for use T ($-15 \leq T \leq 65°$ C.) and each wavelength for use $\lambda$ ($395 \leq \lambda \leq 415$). Incidentally, image-side numerical aperture NA and a focal length of the objective lens 11 where a light flux having standard wavelength for use $\lambda_0$ enters at standard temperature for use $T_0$ are designed respectively to be 0.65 and 3.0 mm.

FIG. 2 is a side view and FIG. 3 is a front view both showing an outline of objective lens 11. The objective lens 11 is made of plastic, and as shown in FIG. 2, the objective lens 11 is composed of lens main body 111 and diffractive structure portion 112 that is provided on an optical functional surface (hereinafter referred to as a base aspheric surface) of the lens main body 111 on an object side. Incidentally, the base aspheric surface is a surface shown with broken lines in FIG. 2.

The diffractive structure portion 112 is formed stepwise so that a thickness in the optical axis direction of each section may increase as the section becomes more distant from the optical axis 6, and it is divided into plural ring-shaped zones 101-n (n<101) which are in a form of concentric circles having their centers on the optical axis 6.

A form and a refractive index of each of a refracting interface of objective lens 11, namely, the surface of the diffractive structure portion 112 (hereinafter referred to as First surface 11A) and optical functional surface (hereinafter referred to as Second surface 11B) of lens main body 111 on the image side, are established as follows.

Table 1 shows lens data of the objective lens 11.

TABLE 1

| | Lens data | | |
|---|---|---|---|
| Surface No. | R | d | n |
| Object point | | ∞ | |
| 1 (Aspheric surface, diffractive surface) | Described below | 1.500 | 1.5246 |
| 2 (Aspheric surface) | Described below | 1.173 | |
| 3 (Cover glass) | ∞ | 0.60 | 1.6187 |
| 4 | ∞ | | | f = 2.4 mm
NA0.65

In Table 1, Surface Nos. 1 and 2 are respectively First surface 11A and Second surface 11B both of objective lens 11. Surface Nos. 3 and 4 are respectively the surface of HD-DVD 8 and an information recording surface.

A base aspheric surface of the First surface 11A and the Second surface 11B both of the objective lens 11 are formed to be aspheric surfaces which are symmetrical about the optical axis 6. These First surface 11A and the Second surface 11B are prescribed by the expression of an aspheric surface form wherein a coefficient shown in Table 2 is substituted for the following expression.

$$X = \frac{(h^2/R)}{1 + \sqrt{1 - (1+\kappa)(h/R)^2}} + \sum_{i=0}^{9} A_{2i} h^{2i} \quad \text{(Numeral 1)}$$

In the above expression, $A_{2i}$ represents an aspheric surface coefficient and h represents a height (mm) from the optical axis.

TABLE 2

| First surface Aspheric surface coefficient | |
|---|---|
| κ | −0.83899 |
| R | 1.5518 |
| $A_0$ | 0.0 |
| $A_2$ | 0.0 |
| $A_4$ | $0.99748 \times 10^{-2}$ |
| $A_6$ | $-0.67103 \times 10^{-4}$ |

TABLE 2-continued

First surface
Aspheric surface coefficient

| | |
|---|---|
| $A_8$ | $0.14401 \times 10^{-2}$ |
| $A_{10}$ | $-0.71063 \times 10^{-3}$ |
| $A_{12}$ | $0.27069 \times 10^{-3}$ |
| $A_{14}$ | $-0.65903 \times 10^{-4}$ |

TABLE 3

Second surface
Aspheric surface coefficient

| | |
|---|---|
| κ | −50.0000 |
| R | −6.2256 |
| $A_0$ | 0.0 |
| $A_2$ | 0.0 |
| $A_4$ | $0.93157 \times 10^{-2}$ |
| $A_6$ | $0.48983 \times 10^{-2}$ |
| $A_8$ | $-0.60555 \times 10^{-2}$ |
| $A_{10}$ | $0.19105 \times 10^{-2}$ |
| $A_{12}$ | $-0.25287 \times 10^{-3}$ |
| $A_{14}$ | $0.58014 \times 10^{-5}$ |

In this case, X represents a length (advancing direction of light is assumed to be positive) in the optical axis direction, h represents a height from the optical axis, R represents a paraxial radius of curvature, κ represents constant of the cone and A represents an aspheric surface coefficient.

The number of ring-shaped zones of the diffractive structure portion 112 is determined to satisfy $140 \leq Lm \, (f^{1/2}) \leq 220$. Here, L represents the number of ring-shaped zones. The symbol m represents the order of diffracted light having the greatest diffraction efficiency among diffracted light generated by the diffractive structure portion 112 when conducting recording of information and/or reproducing of recorded information for the optical information recording medium 8. Further, f represents a focal length (mm).

A pitch of ring-shaped zones 101-n of the diffractive structure portion 112 is determined by the optical path difference function wherein a coefficient shown in Table 4 is substituted for the following expression.

$$\Phi(h) = \sum_{i=0}^{5} B_{2i} h^{2i} \qquad \text{(Numeral 2)}$$

Here, $B_{2i}$ represents a coefficient of the optical path difference function.

TABLE 4

Coefficient of optical path difference function

| | |
|---|---|
| Standard wavelength | 405 nm |
| Order of diffraction | 3 |
| $B_0$ | 0.0 |
| $B_2$ | $-0.37934 \times 10^{-2}$ |
| $B_4$ | $0.52430 \times 10^{-3}$ |
| $B_6$ | $-0.22084 \times 10^{-3}$ |
| $B_8$ | $-0.71200 \times 10^{-4}$ |
| $B_{10}$ | $0.17193 \times 10^{-4}$ |

In the aforesaid expression, $B_2$ represents a coefficient of the optical path difference function, and h represents a height (mm) from the optical axis.

Further, a difference in level between two adjoining ring-shaped zones, namely, a displacement amount in the direction of optical axis 6 between adjoining ring-shaped zones is established so that an optical path difference in an amount equivalent to a multiple of an integer of standard wavelength for use $\lambda_0$ may be generated between a beam passing through a certain ring-shaped zone and a beam passing through its adjoining ring-shaped zone, and shifting of wavefront may not be generated. To be more concrete, the difference in level between two adjoining ring-shaped zones, namely, the displacement amount in the direction of the optical axis 6 between adjoining ring-shaped zones is determined so that a blazed wavelength of the diffractive structure portion 112 may agree with a standard wavelength for use. Incidentally, a blazed wavelength is a wavelength for which the diffraction efficiency of diffracted light generated by the diffractive structure portion 112 is the greatest.

With respect to paraxial power $\phi D$ of the diffractive structure portion 112, $\phi D/\phi D_0 = 0.54$ holds. Here, $\phi D_0$ is a paraxial power of the diffractive structure portion 112 in the case where paraxial chromatic aberration is corrected completely when power of the diffractive structure portion 112 is changed without changing power of the lens main body 111.

Figure 4:
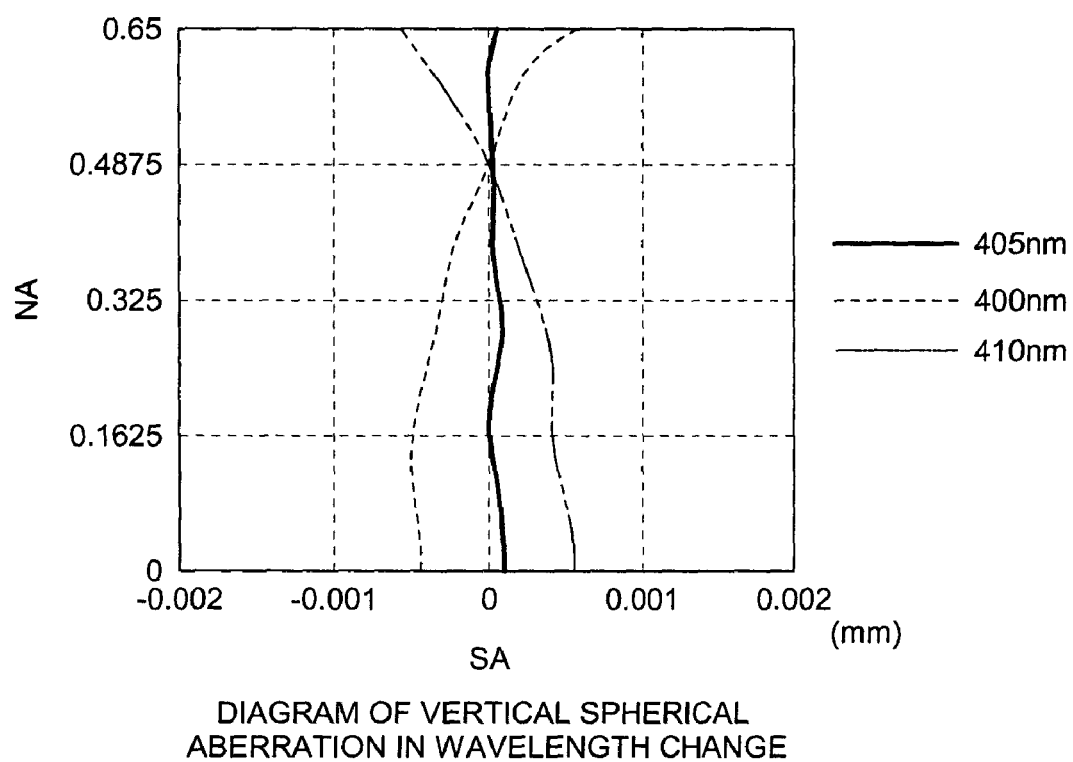
FIG. 4 is a diagram showing vertical spherical aberration of an objective lens in the occasion where a light flux having standard wavelength for use $\lambda_0$ enters the objective lens at standard temperature for use $T_0$.

Vertical spherical aberrations under the conditions of standard temperature for use $T_0$ and standard wavelength for use $\lambda_0$ (405 nm) for the objective lens 11 designed in the aforesaid way are shown in FIG. 4.

In FIG. 4, the vertical axis represents a numerical aperture of objective lens 11, and the horizontal axis represents an amount of tertiary order vertical spherical aberration (mm) of the objective lens 11. In FIG. 4, an amount of tertiary order vertical spherical aberration in the case when a light flux having a wavelength of 400 nm enters and that in the case when a light flux having a wavelength of 410 nm enters are also illustrated.

As is clear from this figure, the tertiary order vertical spherical aberration is made to be smaller than 0.07 $\lambda_0$rms in the objective lens 11 so that a light flux may be converged under the condition of substantially no aberration.

Figure 5:
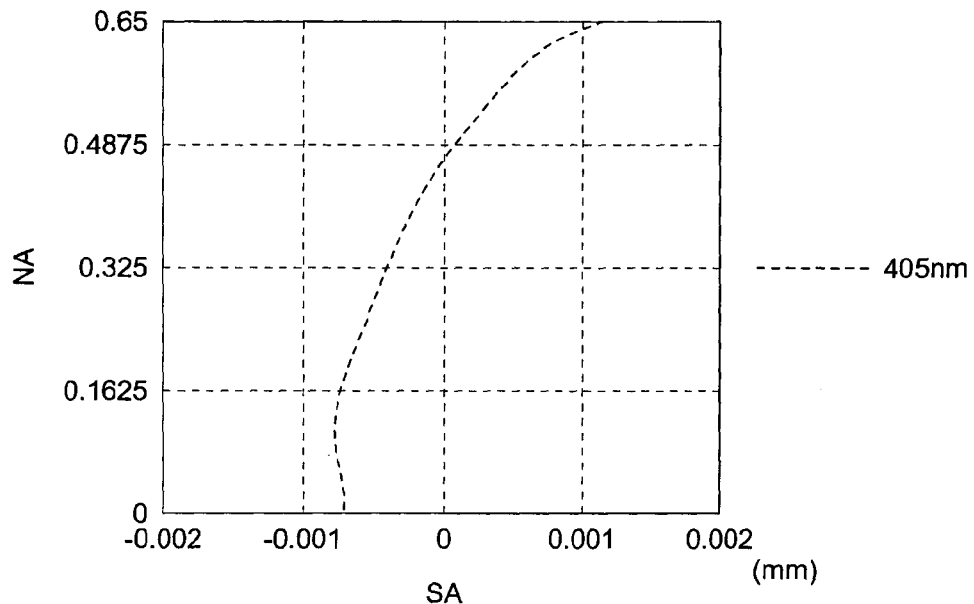
FIG. 5 is a diagram showing vertical spherical aberration of an objective lens in the occasion where a light flux having standard wavelength for use $\lambda_0$ enters the objective lens at temperature for use T ($T=T_0+40$).

Further, vertical spherical aberration of the objective lens 11 for wavelength 405 nm in the case where temperature for use T is standard temperature for use $T_0+40°$ C. is shown in FIG. 5.

In FIG. 5, the vertical axis represents a numerical aperture of objective lens 11, and the horizontal axis represents an amount (mm) of tertiary order vertical spherical aberration of the objective lens 11.

From this diagram, it is understood that, when temperature for use T is standard temperature for use $T_0+40°$ C., a light flux entering a paraxial area of objective lens 11 is converged on the under side, while, a light flux entering an area on the outer peripheral side is converged on the over side.

Next, referring to FIG. 6, there will be explained amount of change δSA1 of tertiary order spherical aberration component of wavefront aberration of objective lens 11, namely of lens main body 111 and diffractive structure portion 112, which is caused when wavelength for use λ of a light flux is changed within a range of $|\lambda-\lambda_0| \leq 10$ nm.

Figure 6:
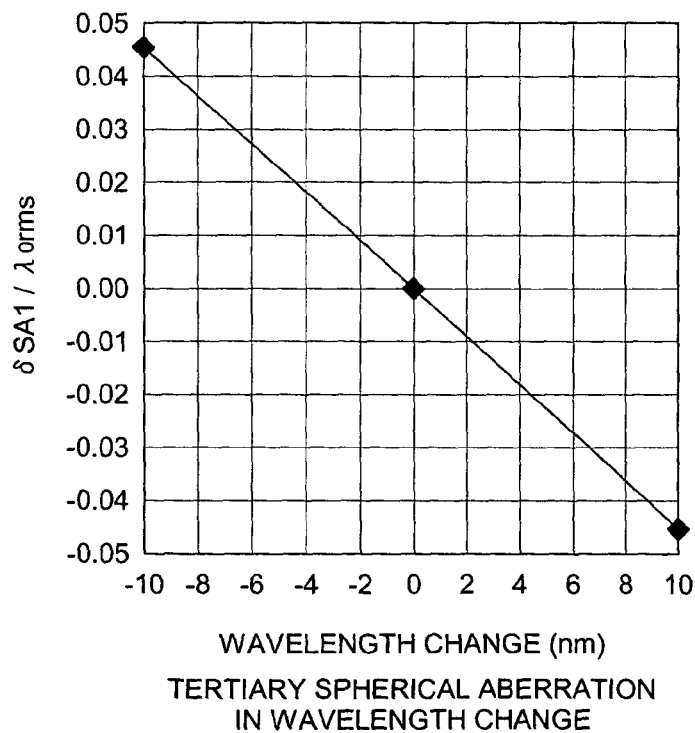
FIG. 6 is a diagram showing amount of change $\delta SA1$ of tertiary order spherical aberration component of wavefront aberration of an objective lens that is caused when wavelength for use $\lambda$ of a light flux is changed within a range of $|\lambda-\lambda_0| \leq 10$ nm.

In FIG. 6, the vertical axis represents a value obtained by dividing amount of change δSA1 of tertiary order spherical aberration component of wavefront aberration of objective lens 11 by $\lambda_0$rms, and the horizontal axis represents an amount (mm) of change of wavelength for use λ from standard wavelength for use $\lambda_0$.

As is clear from this diagram, amount of change δSA1 of tertiary order spherical aberration component of wavefront aberration of objective lens 11 which is caused when wavelength for use λ of a light flux is changed by 5 nm is almost 0.023 $\lambda_0$rms.

Further, amount of change δSA1 of tertiary order spherical aberration component of wavefront aberration of objective lens 11 which is caused when wavelength for use λ of a light flux is made to be greater by 1 nm is almost –0.0046 $\lambda_0$rms.

Next, referring to FIG. 7, there will be explained shifting δWD of light-converging spot in the optical axis direction that is caused when wavelength for use λ of a light flux is changed from standard wavelength for use $\lambda_0$ within a range of several nanometers. Incidentally, the change of the wavelength for use is one wherein the so-called mode hop that a wavelength of a light flux is changed instantaneously in the course of recording data on HD-DVD 8 is assumed. Since this mode hop takes place instantaneously, it is sometimes impossible to compensate fully the shifting δWD of light-converging spot that is caused by the mode hop, even when actuator 14 is moved. In the optical pickup device 1, therefore, the shifting δWD of light-converging spot is compensated by the objective lens.

Figure 7:
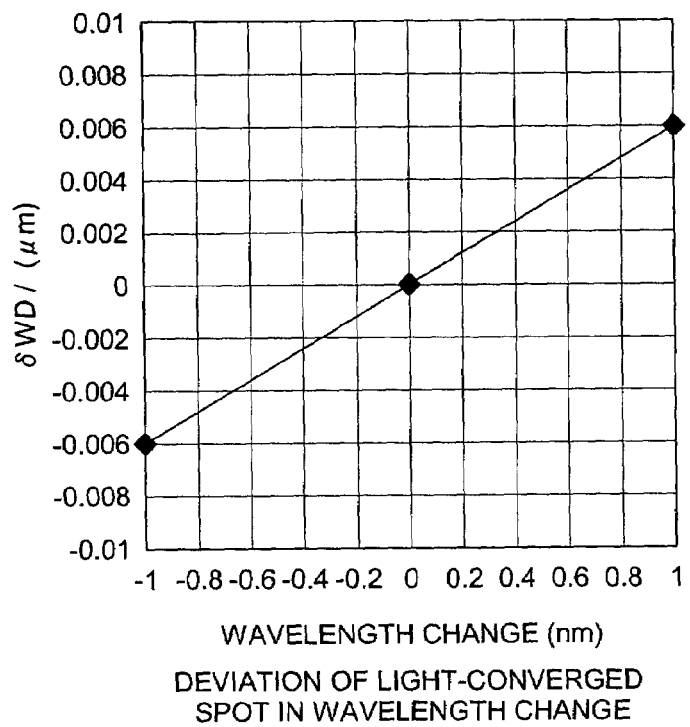
FIG. 7 is a diagram showing shifting $\delta WD$ of a light-converging spot in the direction of the optical axis that is caused when wavelength for use λ of a light flux is changed within a range of |λ−λ$_0$|≦1 nm.

In FIG. 7, the vertical axis represents shifting δWD of light-converging spot in the optical axis direction, and the horizontal axis represents an amount (nm) of a change of wavelength for use λ from standard wavelength for use $\lambda_0$.

Here, in optical pickup device 1 employing HD-DVD 8 as a medium, if a diameter of light-converging spot is not more than ($\lambda_0$/2NA), namely, if the light-converging spot is within a range of ($\lambda_0$/2NA$^2$), light is converged almost on one point to make recording and reproducing of information possible. In the optical pickup device 1 in the present embodiment, the focal depth of the optical system is about 480 nm because numerical aperture NA is 0.65 and standard wavelength for use $\lambda_0$ is about 405 nm.

In FIG. 7, shifting δWD of light-converging spot in the optical axis direction in the occasion where a width of changes of a wavelength of a light flux entering is in a range of standard wavelength for use $\lambda_0$±1 nm is about 0.006 μm which is about 6 nm in a word. In the objective lens 11, in a word, shifting δWD of light-converging spot in the optical axis direction that is caused when wavelength for use λ of a laser light source is changed is compensated to be within a range of a half of the focal depth.

Next, amount of change δSA2 of tertiary order spherical aberration component of wavefront aberration of objective lens 11 that is caused when temperature for use T is changed within a range of |T–$T_0$|≦40 deg. will be explained as follows, referring to FIG. 8.

Figure 8:
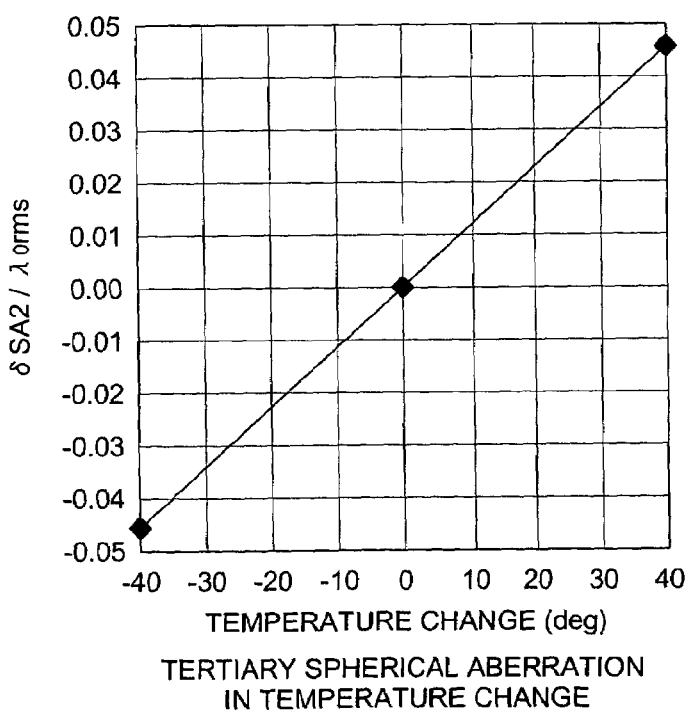
FIG. 8 is a diagram showing amount of change δSA2 of tertiary order spherical aberration component of wavefront aberration of an objective lens that is caused when temperature for use T is changed within a range of |T−T$_0$|≦40° C.

In FIG. 8, the vertical axis represents a value obtained by dividing amount of change δSA2 of tertiary order spherical aberration component of wavefront aberration of objective lens 11 with $\lambda_0$rms, and the horizontal axis represents an amount of a change (deg.) of temperature for use T from standard temperature for use $T_0$.

As is clear from the figure, amount of change δSA2 of tertiary order spherical aberration component of wavefront aberration of objective lens 11 that is caused when temperature for use T is changed by 40 deg. is 0.044 $\lambda_0$rms.

The objective lens 11 stated above makes it possible to compensate amount of change δSA1 of tertiary order spherical aberration component of wavefront aberration of objective lens 11 that is caused when wavelength for use λ of laser light source L1 is changed by 5 nm to be mostly 0.023 $\lambda_0$rms with diffractive structure portion 112. Therefore, recording and reproducing of information can be conducted surely, independently of changes in wavelength for use λ.

Further, it is possible to compensate amount of change δSA1 of tertiary order spherical aberration component of wavefront aberration of objective lens 11 that is caused when wavelength for use λ of laser light source L1 is changed by 1 nm to be mostly –0.0046 $\lambda_0$rms with diffractive structure portion 112. It is therefore possible to compensate amount of change δSA1 of tertiary order spherical aberration component of wavefront aberration that is caused by wavelength changes resulting from changes in temperature for use T and amount of change δSA1 of tertiary order spherical aberration component of wavefront aberration that is caused by wavelength changes which do not result from changes in temperature for use T, with diffractive structure portion 112.

Further, it is possible to compensate, by means of diffractive structure portion 112, shifting δWD of light-converging spot 7a in the direction of optical axis 6 that is caused when wavelength for use λ of laser light source L1 is changed by 1 nm to be almost 0.006 μm, namely, to be within a half of a focal depth. Therefore, recording and reproducing of information can be conducted surely, independently of changes in wavelength for use λ.

Since paraxial power φD of the diffractive structure portion 112 satisfies 0≦φD/φ$D_0$≦0.7, shifting δWD of light-converging spot 7a in the direction of optical axis 6 that is caused when wavelength for use λ of laser light source L1 is changed can be compensated by diffractive structure portion 112. Therefore, recording and reproducing of information can be conducted surely, independently of changes in wavelength for use λ.

It is further possible to compensate, by means of diffractive structure portion 112, amount of change δSA2 of tertiary order spherical aberration component of wavefront aberration of objective lens 11 that is caused when the refractive index of lens main body 111 is changed by changes of temperature for use T of optical pickup device 1 to be almost 0.044 $\lambda_0$rms. Therefore, recording and reproducing of information can be conducted surely, independently of changes in temperature for use T.

The objective lens is made of plastic. Therefore, molding of the objective lens is easy, and a material is lower in cost and is lighter in weight compared with glass, which makes optical pickup device 1 to be light in weight and low in cost.

The embodiment of the optical pick-up apparatus and the optical element of the present invention will now be explained, while referring to the drawings.

The optical pick-up apparatus is designed under the condition that the light source having the working standard wavelength of 380 m–450 nm is used, and recording and/or reproducing of information are performed onto high density DVD having the protective substrate which is about 0.6 mm in thickness, and further the diffractive structure (concentric ring-shaped zone) is formed on the optical surface of at least any one of a plurality of the optical elements of which the optical pick-up apparatus is composed.

Figure 9:
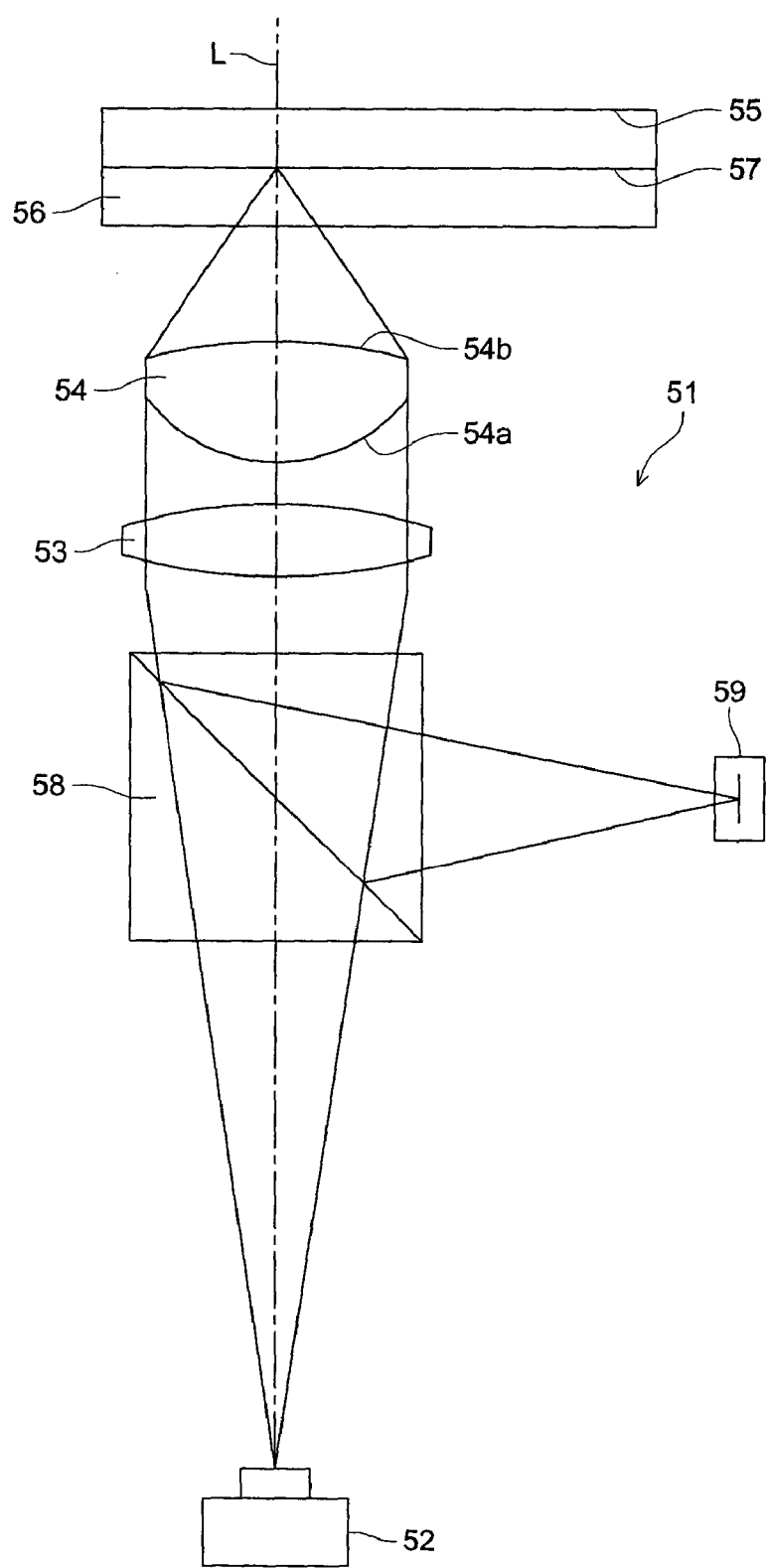
FIG. 9 is a schematic diagram showing another example of an optical pick-up apparatus and an optical element of the present embodiment.

As shown in FIG. 9, optical pick-up apparatus 51 changes light flux with the working standard wavelengths of 380–450 nm emitted from laser oscillator 52 as the light source, to parallel light flux by passing it through collimator lens 53. After passing through the objective lens 54, and protective substrate 6 of high density DVD 55, the light flux is focused on information recording surface 57, on optical axis LA, resulting in a beam spot.

After which, the light flux is modulated by information pits and reflected on information recording surface 57, and is further reflected by beam splitter 58, resulting in a beam spot on the light receiving surface of detecting device 59, after which, signals outputted from detecting device 59 are used, after which readout signals of information recorded on high density DVD can be obtained.

When the number of concentric ring-shaped zones around the optical axis is L, the order of the diffracted light flux having the maximum diffraction efficiency is k (a positive integer), and the focal distance is f mm, and when L, k and f are set within the limits shown by the following formula, Formula $$90 \leq Lk\ (f^{1/2}) \leq 300$$

or more preferably, within the limit shown by formula, $$140 \leq Lk\ (f^{1/2}) \leq 220,$$

the inventor of the present invention understood that it was possible to control, within an acceptable range, both aberration (thermal characteristic aberration), generated by the change of temperature which is greater than the assumed design value, and axial chromatic aberration, generated by the change of the wavelength of the emitted light flux, which is also greater than the assumed design value.

Which is to say, it is possible by using the optical element and the optical pick-up apparatus of the present invention, in which the diffractive function of the diffractive structure is used, to compensate for changes of the best focal position and changes of wave-front aberration, caused by changes of the wavelength of an outgoing beam, and changes of wave-front aberration caused by changes of the refraction index due to temperature changes.

For example, setting f=2.4 mm, k=1, and, to form the ring-shaped diffractive zone on the objective lens as the optical element, when L, as the number of the ring-shaped diffractive zones, is limited to the range of 91<L<142, it is possible to correct thermal characteristic aberration and axial chromatic aberration and put them within the allowance level, and further, it is possible to obtain the objective lens having high utilization efficiency of light flux, and using a first ordered diffracted light which generates the maximum diffraction efficiency.

Next, to be explained will be an example of the optical pick-up apparatus and the optical element which are detailed in the above embodiment.

Figure 10:
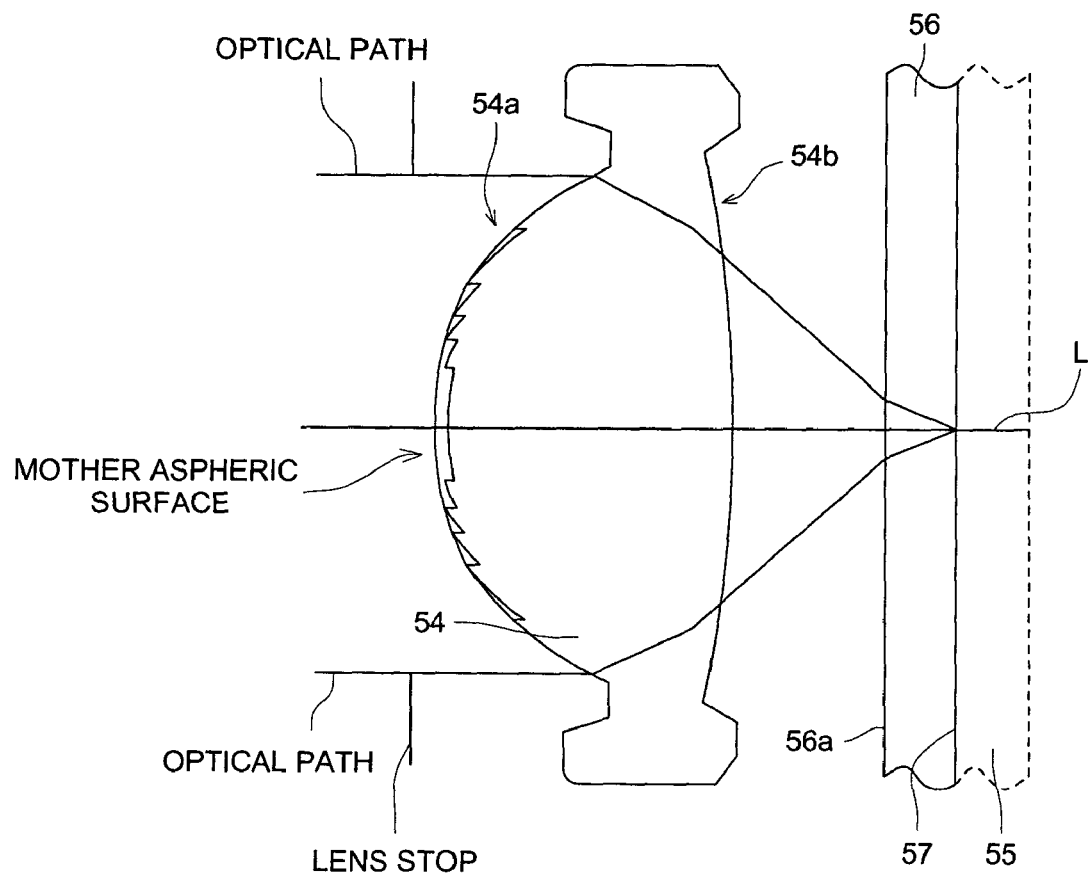
FIG. 10 is a side view showing the structure of an objective lens.

In the present embodiment, as shown in FIG. 10, objective lens 54 is a single lens having aspheric surfaces on both its surfaces, and ring-shaped zones are formed on aspheric surface 54a, which faces the light source.

Tables 5–7 show the lens data of the objective lens.

TABLE 5

| Surface No. | Lens data | | |
|---|---|---|---|
| | R | d | n |
| Object point | ∞ | | |
| 1 (Aspheric surface, diffractive surface) | Described below | 1.500 | 1.5246 |
| 2 (Aspheric surface) | Described below | 1.173 | |
| 3 (Cover glass) | ∞ | 0.60 | 1.6187 |
| 4 | ∞ | | | f = 2.4 mm
NA 0.65

As shown in Table 5, objective lens 54 of the present embodiment is such that focal length f=2.4 mm, and image side numerical aperture NA=0.65, when the working standard wavelength is 405 nm, and further, the number of ring-shaped zones L=100, and k=1, at the effective aperture (NA=0.65).

Accordingly, the above establishment results in Lk (f$^{1/2}$) ≈155, which produces an objective lens satisfying the following formula.

$$140 \leq Lk\ (f^{1/2}) \leq 220.$$

In Table 1, surface 1 shows first surface 54a of objective lens 54, and surface 52 shows second surface 54b of objective lens 54. Surface 53 shows surface 6b of the protective substrate of high density DVD, and surface 54 shows information recording surface 57. R shows a curvature radius, d shows an axial distance under the condition that the information recording surface of high density DVD is an original point, and the reflecting direction of light flux is positive, and n shows the refraction index.

The first surface is formed in such a way that the mother aspheric surface shown in FIG. 10 is concentrically divided into ring-shaped zones around optical axis LA, in the direction of optical axis LA, and the thickness increases while getting away from the optical axis.

The length of the step between the adjacent two ring-shaped zones is determined in such a way that the optical path difference, being nearly integral multiples of the working standard wavelength, is generated between the light flux passing through a ring-shaped zone and the light flux passing through its adjacent ring-shaped zone, and no misalignment of the wave front occurs.

First surface 54a and second surface 54b of objective lens 54 are formed as aspheric surfaces, being in axial symmetry around optical axis LA, which are stipulated by following expression 1 in which coefficients shown in Table 6 are substituted.

[Expression 1]

Expression for the aspheric surface $$X = \frac{(h^2/R)}{1+\sqrt{1-(1+\kappa)(h/R)^2}} + \sum_{i=0}^{9} A_{2i} h^{2i}$$

where, X is the axis in the optical axial direction (positive in the light traveling direction), h is the height above the optical axis, R is the paraxial curvature radius, κ is the cone coefficient, and $A_{2j}$ is the aspheric surface coefficient.

Further, the pitch of the diffractive ring-shaped zone is generally defined by the optical path difference function. Specifically, optical path difference function Φ(h) is shown by expression 2 in units mm, and is stipulated by expression 2 in which the coefficients shown in Table 2 are substituted.

[Expression 2]

Optical path difference function $$\Phi(h) = \sum_{i=0}^{5} B_{2i} h^{2i}$$

where, $B_{2j}$ is the coefficient of the optical path difference function, and h is the height above the optical axis.

TABLE 6

Embodiment
The first surface
Aspheric surface coefficient

| | |
|---|---|
| κ | −0.83899 |
| R | 1.5518 |
| $A_0$ | 0.0 |
| $A_2$ | 0.0 |
| $A_4$ | $0.99748 \times 10^{-2}$ |
| $A_6$ | $-0.67103 \times 10^{-4}$ |
| $A_8$ | $0.14401 \times 10^{-2}$ |
| $A_{10}$ | $-0.71063 \times 10^{-3}$ |
| $A_{12}$ | $0.27069 \times 10^{-3}$ |
| $A_{14}$ | $-0.65903 \times 10^{-4}$ |

Coefficient of optical path difference function

| | |
|---|---|
| Standard wavelength | 405 nm |
| Order of diffraction | 3 |
| $B_0$ | 0.0 |
| $B_2$ | $-0.37934 \times 10^{-2}$ |
| $B_4$ | $0.52430 \times 10^{-3}$ |
| $B_6$ | $-0.22084 \times 10^{-3}$ |
| $B_8$ | $-0.71200 \times 10^{-4}$ |
| $B_{10}$ | $0.17193 \times 10^{-4}$ |

The second surface
Aspheric surface coefficient

| | |
|---|---|
| κ | −50.0000 |
| R | −6.2256 |
| $A_0$ | 0.0 |
| $A_2$ | 0.0 |
| $A_4$ | $0.93157 \times 10^{-2}$ |
| $A_6$ | $-0.48983 \times 10^{-2}$ |
| $A_8$ | $-0.60555 \times 10^{-2}$ |
| $A_{10}$ | $0.19105 \times 10^{-2}$ |
| $A_{12}$ | $0.25287 \times 10^{-3}$ |
| $A_{14}$ | $0.58014 \times 10^{-5}$ |

Table 7 shows the evaluation result in the case that the optical element and the optical pick-up apparatus of the present embodiment were used.

TABLE 7

| | | |
|---|---|---|
| (1) | Change of position of the best image point generated by change (+1 nm) of the wavelength | 0.006 μm |
| (2) | Wave-front aberration generated by change (+5 nm) of the wavelength | 0.024 λrms |
| (3) | Wave-front aberration generated by change (+30° C.) of temperature | 0.032 λrms | rms: standard deviation value

In Table 7, (1) shows variation of the position of the best image point which is generated by the change (an increase of 1 nm) of the wavelength of the outgoing light flux, (2) shows wave-front aberration generated by the change (an increase of 5 nm) of the wavelength of the outgoing light flux, and (3) shows wave-front aberration generated by changes of the refraction index due to the temperature change (an increase of 30 degrees) from the working standard temperature.

From Table 3, it is understood that the optical element and the optical pick-up apparatus can be controlled within an acceptable range, both thermal characteristic aberration and axial chromatic aberration generated by changes of wavelength of outgoing light flux.

As a comparative example, explained next is the case in that the objective lens which does not compensate for axial chromatic aberration, is used in optical pick-up apparatus 51 shown in FIG. 10.

Tables 4 and 5 show the data of the objective lens.

This objective lens is established under the condition of the number of ring-shaped zones L=47, and k=1, at the effective aperture (NA=0.65), a focal length f=3.33 mm using light source wavelength 400 nm, and image side numerical aperture NA=0.70.

Accordingly, Lk ($f^{1/2}$) equals to 86 approximately, that is, this objective lens does not satisfy the limit shown by formula $90 \leq Lk\ (f^{1/2}) \leq 300$.

In addition, this objective lens has a pitch of the ring-shaped zones corresponding to the image side maximum numerical aperture of the objective lens, Pf=0.011 mm, and the pitch of the ring-shaped zone corresponding to the numerical aperture which is half the maximum numerical aperture, Ph=0.060 mm.

The first surface, being the mother aspheric surface, and the second surface of the objective lens are formed as aspheric surfaces, being in axial symmetry around the optical axis, which are stipulated by expression 1 in which coefficients shown in Tables 8 and 9 are substituted.

Optical path difference function Φ(h) is stipulated by expression 2 in which the coefficients shown in Table 9 are

TABLE 8 lens data

| Surface No. | R | d | n |
|---|---|---|---|
| Object point | ∞ | | |
| 1 (Aspheric surface, diffractive surface) | 2.65858 | 2.40 | 1.71657 |
| 2 (Aspheric surface) | −15.86969 | 1.297 | |
| 3 (Cover glass) | ∞ | 0.1 | 1.62158 |
| 4 | ∞ | 0.704 | | f = 3.33 mm
NA 0.70

TABLE 9

Embodiment
The first surface
Aspheric surface coefficient

| | |
|---|---|
| κ | 0.0 |
| $A_4$ | $-7.9616 \times 10^{-4}$ |
| $A_6$ | $-5.7265 \times 10^{-4}$ |
| $A_8$ | $8.3209 \times 10^{-5}$ |
| $A_{10}$ | $-4.1599 \times 10^{-5}$ |

Coefficient of optical path difference function

| | |
|---|---|
| Standard wavelength | 400 nm |
| $B_2$ | $-1.4046 \times 10^{-3}$ |
| $B_4$ | $-8.6959 \times 10^{-4}$ |
| $B_6$ | $2.3488 \times 10^{-4}$ |
| $B_8$ | $-5.2455 \times 10^{-5}$ |
| $B_{10}$ | $3.6385 \times 10^{-6}$ |

The second surface
Aspheric surface coefficient

| | |
|---|---|
| κ | 0.0 |
| $A_4$ | $3.11131 \times 10^{-2}$ |
| $A_6$ | $-1.18548 \times 10^{-2}$ |
| $A_8$ | $1.63937 \times 10^{-3}$ |
| $A_{10}$ | $-6.60514 \times 10^{-5}$ |

Figure 11:
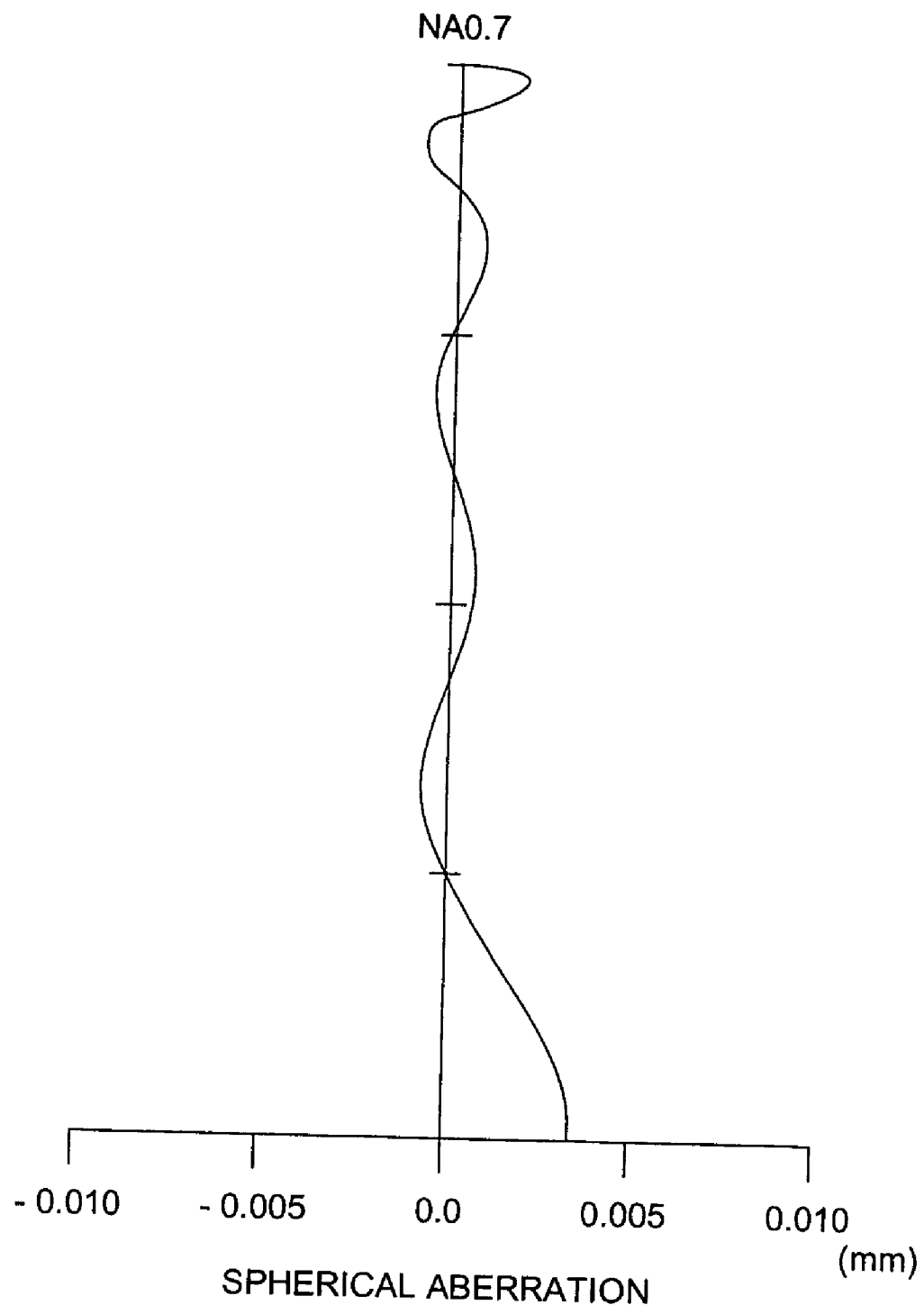
FIG. 11 shows a longitudinal spherical aberration of an objective lens as a comparative example.

FIG. 11 is a spherical aberration graph of the objective lens as the comparative example, while covering numerical apertures from 0 to 0.70, with the working standard wavelength 400 nm, by which it is understood that there is hardly any aberration for numerical apertures from 0 to 0.70.

Concerning the objective lens of the comparative example, as mentioned above, Lk ($f^{1/2}$) equals approximately 86, that is, this objective lens does not satisfy the condition shown by formula $90 \leq Lk(f^{1/2}) \leq 300$.

However, the inventor studied and understood that in order to correct for axial chromatic aberration of this objective lens, it was necessary to increase number L of the ring-shaped zones, and thereby when L was set within the condition shown by the following formula $$90 \leq Lk\,(f^{1/2}) \leq 300$$

the inventor understood that it was possible to control, within an acceptable range, both spherical aberration generated by greater changes of temperature than the assumed design value, and axial chromatic aberration generated by also greater changes of the wavelength of the outgoing light flux, than the assumed design value.

The invention described in Item (1) makes it possible to compensate amount of change δSA1 of tertiary order spherical aberration component of wavefront aberration of a lens main body and a diffractive structure portion that is caused when wavelength for use λ of a laser light source is changed to be a certain value or less. Further, shifting δWD of a light-converging spot in the direction of the optical axis that is caused when wavelength for use λ of a laser light source is changed can be compensated to a certain value or less. In addition, it is also possible to compensate amount of change δSA2 of tertiary order spherical aberration component of wavefront aberration of a lens main body and a diffractive structure portion that is caused when the refractive index of lens main body is changed by changes of temperature for use T of optical pickup device 1 to a certain value or less. Therefore, recording and reproducing of information can be conducted surely, independently of changes in wavelength for use λ and temperature for use T.

In the invention described in Item (2), it is naturally possible to obtain the same effects as those in the invention described in Item (1), and recording and reproducing of information can be conducted surely, independently of changes in wavelength for use λ.

In the invention described in Item (3), it is naturally possible to obtain the same effects as those in the invention described in Item (1) or (2), and amount of change δSA1 of tertiary order spherical aberration component of wavefront aberration that is caused by changes in wavelength resulting from changes in temperature for use T and amount of change δSA1 of tertiary order spherical aberration component of wavefront aberration that is caused by changes in wavelength which do not result from changes in temperature for use T can be compensated by the first compensating function.

In the invention described in Item (4), it is naturally possible to obtain the same effects as those in either one of Items (1)–(3), and recording and reproducing of information can be conducted surely, independently of changes in wavelength for use λ in an optical pickup device employing HD-DVD as a medium.

In the invention described in Item (5), it is naturally possible to obtain the same effects as those in either one of Items (1)–(4), and recording and reproducing of information can be conducted surely, independently of changes in wavelength for use λ.

In the invention described in Item (6), it is naturally possible to obtain the same effects as those in either one of Items (1)–(5), and recording and reproducing of information can be conducted surely, independently of changes in temperature for use T.

In the invention described in Item (7), it is possible to obtain the same effects as those in Items (1)–(6) by the objective lens composed of a diffractive structure portion composed of ring-shaped zones in the prescribed number and of a lens main body.

In the invention described in Item (8), it is possible to obtain the same effects as those in Items (1)–(7) by the objective lens composed of a diffractive structure portion composed of ring-shaped zones in the prescribed number and of a lens main body.

In the invention described in Item (9), it is naturally possible to obtain the same effects as those in either one of Items (1)–(5), and it is possible to prevent that recording density of an optical information recording medium is lowered when an image-side numerical aperture of an objective lens becomes smaller, and to prevent that manufacture of an objective lens becomes difficult when an image-side numerical aperture of an objective lens becomes greater.

In the invention described in Item (10), it is possible to obtain the same effects as those in Items (1)–(9) as an objective lens used in an optical pickup device employing HD-DVD as a medium.

In the invention described in Item (11), it is naturally possible to obtain the same effects as those in Items (1)–(10), and it is possible to make the optical pickup device to be light in weight and to be low in cost.

In the invention described in Item (12), it is naturally possible to obtain the same effects as those in Items (1)–(11), and it is possible to conduct recording and reproducing of information, independently of changes in wavelength for use λ and temperature for use T.

By Items 13–19, when recording on and/or reproducing of information from the information recording surface of the optical information recording medium having the protective substrate which is about 0.6 mm in thickness, is performed by focusing light flux of working standard wavelengths of 380–450 nm, by setting the order of the diffracted light flux, having the maximum diffraction efficiency, to k (a positive integer), among the diffracted light fluxes produced by the diffractive structure including L pieces of the ring-shaped zones around the optical axis, and also by setting the focal distance to f mm, it is possible to produce an optical element and an optical pick-up apparatus which can compensate for axial chromatic aberration and spherical aberration caused by changes of temperature, by satisfying the following formula, $$90 \leq Lk\,(f^{1/2}) \leq 300.$$

What is claimed is:

1. An objective lens for use in an optical pickup device for conducting reproducing and/or recording information for an optical information recording medium equipped with a protective substrate having a thickness of 0.6 mm and to converge a light flux having a working reference wavelength $\lambda_0$ (380 nm $\leq \lambda_0 \leq$ 450 nm) emitted from a laser light source under a working reference temperature $T_0$ onto an information recording plane of the optical information recording medium with almost no aberration, comprising:

a lens main body; and a diffractive structural section provided on at least one optical functional surface of the lens body;

wherein the diffractive structural section has a first compensating function to compensate a change amount $\delta SA1$ of the third-order spherical aberration component of wavefront aberration caused by a fluctuation of a working wavelength $\lambda$ ($|\lambda-\lambda_0|\leq 10$ nm) on the lens main body and the diffractive structural section to be less than a predetermined value, a second compensating function to compensate a deviation $\delta WD$ of a converged-light spot in an optical axis direction caused by a fluctuation of a working wavelength to be less than a predetermined value, and a third compensating function to compensate a change amount $\delta SA2$ of the third-order spherical aberration component of wavefront aberration caused by a change of a refractive index of the lens body due to a fluctuation of a working temperature T ($|T-T_0|\leq 40°$ C.) on the lens main body and the diffractive structural section to be less than a predetermined value.

2. The objective lens of claim 1, wherein when the working wavelength fluctuates by 5 nm, the change amount $\delta SA1$ of the third-order spherical aberration component of wavefront aberration on the lens main body and the diffractive structural section is compensated within the following range by the first compensating function of the diffractive structural section:

$$|\delta SA1| \leq 0.04 \; (\lambda_0 rms).$$

3. The objective lens of claim 1, wherein when the working wavelength fluctuates by 1 nm, the change amount $\delta SA1$ of the third-order spherical aberration component of wavefront aberration on the lens main body and the diffractive structural section is compensated within the following range by the first compensating function of the diffractive structural section:

$$-0.008 \; (\lambda_0 rms) \leq \delta SA1 \leq -0.003 \; (\lambda_0 rms).$$

4. The objective lens of claim 1, wherein when the working wavelength fluctuates by 1 nm, the deviation $\delta WD$ of a converged-light spot in an optical axis direction is compensated within the following range by the second compensating function of the diffractive structural section:

$$|\delta WD| \leq 0.1 \; (\mu m).$$

5. The objective lens of claim 1, wherein an paraxial power $\phi D$ of the diffractive structural section satisfies the following formula:

$$0 \leq \phi D/\phi D_0 \leq 0.7$$

where $\phi D_0$ is a paraxial power of the diffractive structural section when chromatic aberration in a paraxial area of the lens main body is corrected completely by changing the power of the diffractive structural section without changing the power of the lens main body.

6. The objective lens of claim 1, wherein when the working temperature fluctuates by 40° C., the change amount $\delta SA2$ of the third-order spherical aberration component of wavefront aberration caused by a change of a refractive index of the lens body on the lens main body and the diffractive structural section is compensated within the following range by the third compensating function of the diffractive structural section:

$$|\delta SA2| \leq 0.055 \; (\lambda_0 rms).$$

7. The objective lens of claim 1, wherein the diffractive structural section is formed by being divided into plural ring-shaped zones with plural concentric circles having the center on the optical axis and satisfies the following formula:

$$90 \leq Lm \; (f^{1/2}) \leq 300$$

where L is the number of ring-shaped zones, m is an order of a diffracted light ray having the maximum diffraction efficiency among diffracted light rays generated by the diffractive structural section when recording and/or reproducing information is conducted for an optical information recording medium, and f is a focal length (mm).

8. The objective lens of claim 7, wherein the following formula is satisfied:

$$140 \leq Lm \; (f^{1/2}) \leq 220.$$

9. The objective lens of claim 1, wherein an image-side numerical aperture of the lens main body is 0.6 to 0.9.

10. The objective lens of claim 9, wherein the image-side numerical aperture of the lens main body is 0.65.

11. The objective lens of claim 1, wherein the lens main body and the diffractive structural section are made of a plastic.

12. An optical pickup apparatus for conducting reproducing and/or recording information for an optical information recording medium, comprising:

a laser light source to emit a light flux; and the objective lens described in claim 1 and to converge the light flux on an information recording plane of the optical information recording medium.

13. An optical element for use in an optical pickup device for conducting reproducing and/or recording information for an optical information recording medium equipped with a protective substrate having a thickness of 0.6 mm and to converge a light flux having a working reference wavelength $\lambda_0$ (380 nm $\leq \lambda_0 \leq$ 450 nm) onto an information recording plane of the optical information recording medium, comprising:

a diffractive structure provided on at least one optical surface of the optical element and including plural ring-shaped zones having a center on an optical axis, wherein the optical element satisfies the following formula:

$$90 \leq Lk \; (f^{1/2}) \leq 300$$

where L is the number of ring-shaped zones, k is an order of a diffracted light ray having the maximum diffraction efficiency among diffracted light rays generated by the diffractive structural section when recording and/or reproducing information is conducted for an optical information recording medium, and f is a focal length (mm).

14. The optical element of claim 13, wherein the following formula is satisfied:

$$140 \leq Lm \; (f^{1/2}) \leq 220.$$

15. The optical element of claim 13, wherein an image-side numerical aperture of the optical element is 0.6 to 0.7.

16. The optical element of claim 15, wherein the image-side numerical aperture of the optical element is 0.65.

17. The optical element of claim 15, wherein the optical element is made of a plastic.

18. An optical pickup device for conducting reproducing and/or recording information for an optical information recording medium equipped with a protective substrate having a thickness of 0.6 mm and to converge a light flux having a working reference wavelength $\lambda_0$ (380 nm $\leq \lambda_0 \leq$ 450 nm) onto an information recording plane of the optical information recording medium, comprising:

an optical element to converge the light flux and including a diffractive structure provided on at least one optical surface of the optical element and including plural ring-shaped zones having a center on an optical axis, wherein the following formula is satisfied:

$$90 \leq Lk\ (f^{1/2}) \leq 300$$

where L is the number of ring-shaped zones, k is an order of a diffracted light ray having the maximum diffraction efficiency among diffracted light rays generated by the diffractive structural section when recording and/or reproducing information is conducted for an optical information recording medium, and f is a focal length (mm).

19. The optical pickup device of claim 18, wherein the following formula is satisfied:

$$140 \leq Lm\ (f^{1/2}) \leq 220.$$

* * * * *